United States Patent
Maybee

(10) Patent No.: US 8,645,920 B2
(45) Date of Patent: Feb. 4, 2014

(54) DATA PARALLELISM AWARE DEBUGGING

(75) Inventor: Paul E. Maybee, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 508 days.

(21) Appl. No.: 12/965,710

(22) Filed: Dec. 10, 2010

(65) Prior Publication Data

US 2012/0151445 A1 Jun. 14, 2012

(51) Int. Cl.
*G06F 9/44* (2006.01)
*G06F 9/45* (2006.01)

(52) U.S. Cl.
USPC ............ 717/124; 717/119; 717/127; 717/149

(58) Field of Classification Search
None
See application file for complete search history.

(56) References Cited

U.S. PATENT DOCUMENTS

| | | | |
|---|---|---|---|
| 6,848,097 B1 | 1/2005 | Alverson et al. | |
| 7,197,745 B2 | 3/2007 | Ray et al. | |
| 7,237,229 B2 | 6/2007 | Ogawa et al. | |
| 7,617,487 B2* | 11/2009 | Kilian et al. | 717/127 |
| 8,370,820 B2* | 2/2013 | Guenthner et al. | 717/149 |
| 8,429,617 B2* | 4/2013 | Demetriou et al. | 717/124 |
| 2005/0050522 A1* | 3/2005 | Kami et al. | 717/124 |
| 2006/0101405 A1* | 5/2006 | Buschardt et al. | 717/124 |
| 2006/0156284 A1* | 7/2006 | Srinivasan | 717/119 |
| 2007/0277152 A1* | 11/2007 | Srinivasan | 717/119 |
| 2008/0163184 A1* | 7/2008 | Kanade | 717/149 |
| 2011/0010691 A1* | 1/2011 | Lu et al. | 717/124 |
| 2011/0022817 A1* | 1/2011 | Gaster et al. | 711/202 |

OTHER PUBLICATIONS

El-Mahdy et al., Efficient parallel selective separable-kernel convolution on heterogeneous processors, Jun. 2010, 6 pages.*
Bissyande et al., Diagnosys: automatic generation of a debugging interface to the Linux kernel, Sep. 2012, 9 pages.*
Greg Watson, 'ptp design document', Pub. Date Nov. 10, 2007, http://www.eclipse.org/ptp/docs/design.html, (12 pages).
David Abramson, 'Parallel Relative Debugging with Dynamic Data Structures', Oct. 7, 2010 (Retrieved Date), (8 pages).
"PIX", http://msdn.microsoft.com/en-us/library/ee417062(VS.85,printer).aspx, Oct. 7, 2010 (Retrieved Date), (2 pages).
"NVIDIA Parallel Nsight", http://developer.nvidia.com/objects/nsight.html, Oct. 7, 2010 (Retrieved Date), (2 pages).
"Using DTrace to Demystify Watchpoints in the Sun Studio dbx Debugger", Aug. 2007, (3 pages).
Appendix B: Debugging and Profiling Parallel Applications, Oct. 7, 2010 (Retrieved Date), (9 pages).
Annemarie Southwell, "Accelerating Visual C++ Applications on GPUs", Sep. 2010, (4 pages).

* cited by examiner

*Primary Examiner* — Thuy Dao
(74) *Attorney, Agent, or Firm* — Brian Haslam; Mike Allen; Micky Minhas

(57) ABSTRACT

The debugging of a kernel in a data parallel environment. A debugger engine interfaces with a data parallel environment that is running one or more data parallel kernels through a first interface. For each of at least one of the one or more kernels, a program object is formulated that abstractly represents the data parallel kernel including data parallel functionality of the kernel. The program object has a second interface that allows information regarding the kernel to be discovered by the debugger user interface module.

20 Claims, 3 Drawing Sheets

DATA PARALLELISM AWARE DEBUGGING

BACKGROUND

In parallel computing environments, multiple processors are used to execute parallel processes. Data parallel computation involves the assignment of portions of a data set as input to each of multiple parallel processes so that each data portion may be processed in parallel. Often, data parallel computation is offloaded to specialized hardware or devices such as, for example, a General-Purpose Graphics Processing Unit (GPGPU).

One way this offloading may occur is via the use of DirectX's Application Program Interface, specifically the DirectCompute method. The user authors a program using a higher level language. The program is then compiled into a program often called a data parallel kernel or "shader". The kernel is then loaded onto the device for execution using DirectX Application Program Interfaces (APIs).

BRIEF SUMMARY

At least one embodiment described herein relates to the debugging of a kernel in a data parallel environment. A debugger engine interfaces with a data parallel environment that is running one or more data parallel kernels through a first interface. For each of at least one of the one or more kernels, a program object is formulated that abstractly represents the data parallel kernel including data parallel functionality of the kernel. The program object has a second interface that allows information regarding the kernel to be discovered by the debugger user interface module. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the debugging of a kernel in a data parallel environment is described. A debugger engine interfaces with a data parallel environment that is running one or more data parallel kernels through a first interface. For each of at least one of the one or more kernels, a program object is formulated that abstractly represents the data parallel kernel including data parallel functionality of the kernel. The program object has a second interface that allows information regarding the kernel to be discovered by the debugger user interface module. First, some introductory discussion regarding computing systems will be described with respect to FIG. 1. Then, the embodiments of the debugging will be described with respect to FIGS. 2 and 3.

Figure 1:
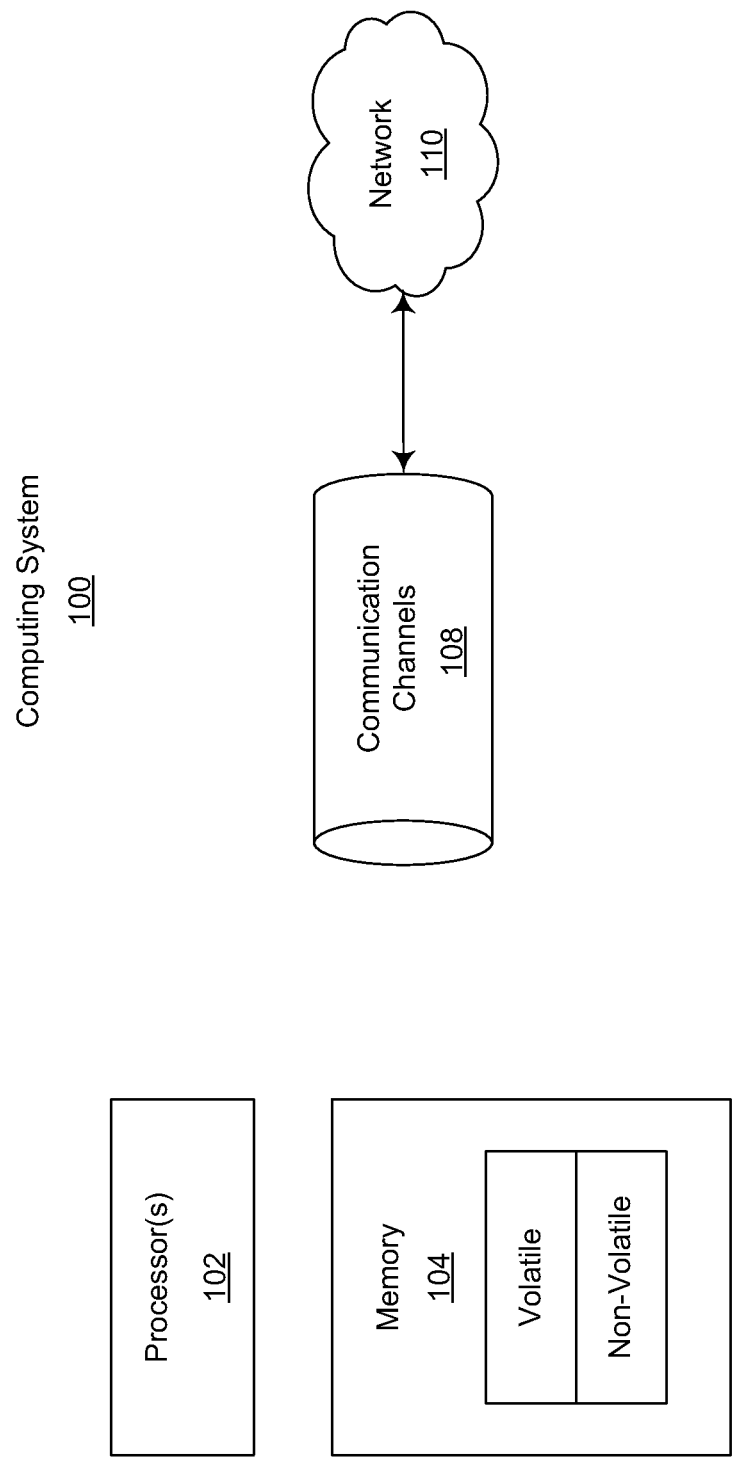
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
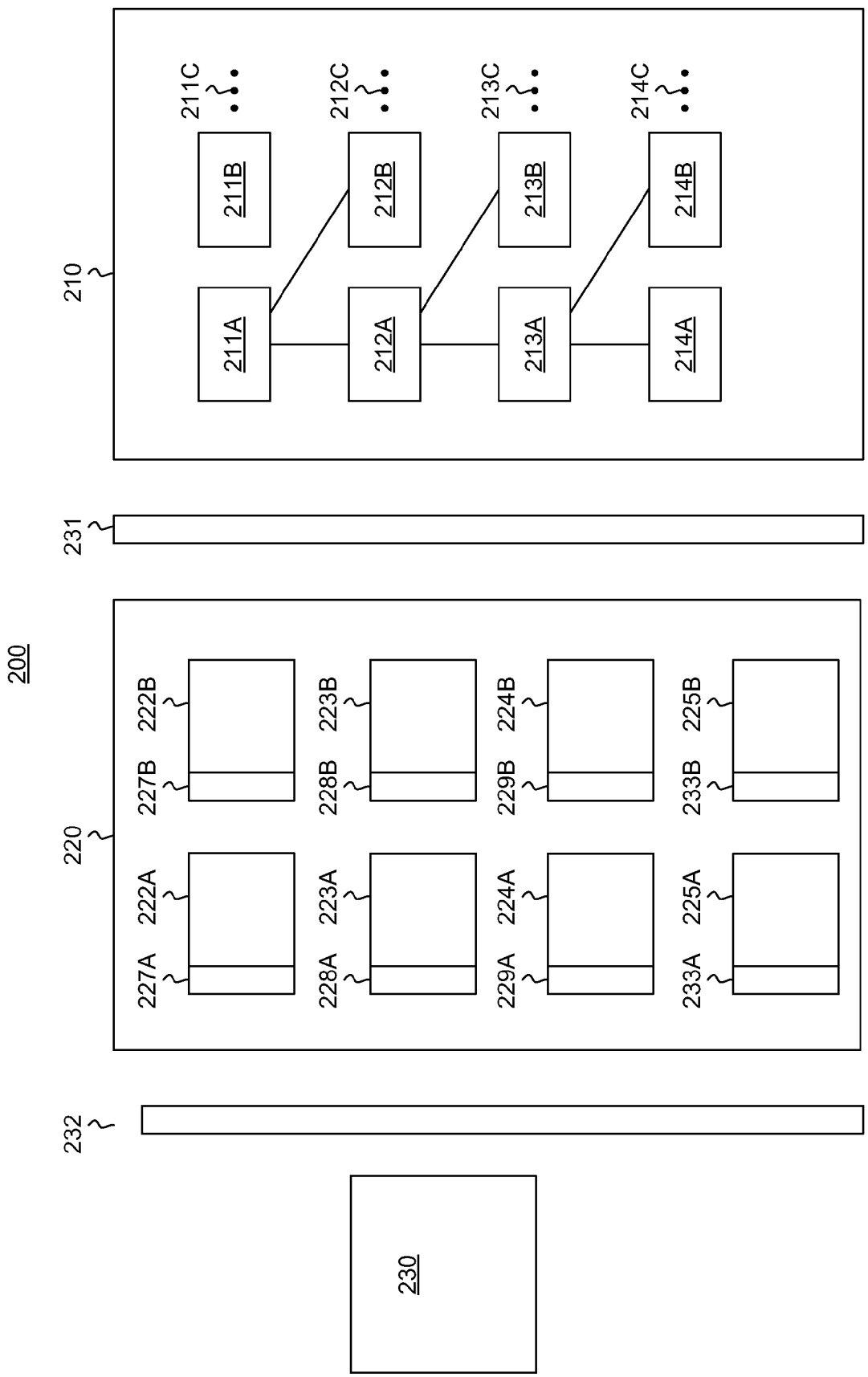
FIG. 2 illustrates an environment in which the principles described herein may operate including a data parallel environment, and debugger engine and a debugger user interface.

FIG. 2 illustrates an environment 200 in which the principles described herein may operate. The environment 200 includes a data parallel environment 210 in which data parallel computation is performed. Data parallel computation involves the assignment of portions of a data set as input to each of multiple parallel processes so that each data portion may be processed in parallel. The data parallel environment 210 includes one or more data parallel devices (referred to hereinafter collectively as "device(s) 211"). FIG. 2 illustrates two such devices 211A and 211B, but the ellipses 211C represents that there may be any number (one or more) of such data parallel devices in the data parallel environment 210. In one embodiment, although not required, at least one, some, or even all of the device(s) 211 are each a general-purpose graphics processing unit (GPGPU).

Each of the device(s) 211 may run one or more kernels (referred to hereinafter collectively as "kernel(s) 212"). For instance, FIG. 2 illustrates that the device 211A operates two kernels 212A and 212B, but the ellipses 212C represents that there may be any number (one or more) of such kernels run by the device 211A. Such kernels are often referred to as a "shader" if the device is a GPGPU.

Each of the kernel(s) 212 may operate one or more thread groups (referred to hereinafter collectively as "thread group(s) 213"). For instance, FIG. 2 illustrates that the program 212A operates two thread groups 213A and 213B, but the ellipses 213C represents that there may be any number (one or more) of such thread groups run by the kernel 212A.

Each of the thread group(s) 213 may be composed of one or more threads (referred to hereinafter collectively as "thread(s) 214"). For instance, FIG. 2 illustrates that the thread group 213A includes two threads 214A and 214B, but the ellipses 214C represents that there may be any number (one or more) of such threads included within the thread group 213A.

The debugger engine 220 communicates with the data parallel environment through an interface 231. For each of at least one, some, or even potentially all of the kernels running in the data parallel environment 210, the debugger engine 220 abstractly represents the data parallel functionality of the kernel using a program object. For instance, in FIG. 2, the debugger engine 220 formulates program objects 222A and 222B corresponding to kernels 212A and 212B that are running in the data parallel environment 210. Each of the program objects 222A and 222B includes an interface 227A and 227B, respectively, through which information regarding the corresponding kernel 212A and 212B may be discovered.

For each of at least one, some, or even potentially all of the thread groups running in the data parallel environment 210, the debugger engine 220 abstractly represents the data parallel functionality of the thread group using a thread group object. For instance, in FIG. 2, the debugger engine 220 formulates thread group objects 223A and 223B corresponding to thread groups 213A and 213B that are running in the data parallel environment 210. Each of the thread group objects 223A and 223B includes an interface 228A and 228B, respectively, through which information regarding the corresponding thread groups 213A and 213B may be discovered. In one embodiment, there are multiple tiers of thread groups such that one or more thread groups are contained within a higher tier thread group. In that case, the debugger engine 220 may represent objects for each node in the hierarchy. In another embodiment, there are no thread groups. Instead, each kernel is simply represented as containing threads even without the use of the concept of thread groups.

Regardless of whether or not thread groups are used, for each of at least one, some, or even potentially all of the threads running in the data parallel environment 210, the debugger engine 220 abstractly represents the functionality of the thread using a thread object. For instance, in FIG. 2, the debugger engine 220 formulates thread objects 224A and 224B corresponding to thread groups 214A and 214B that are running in the data parallel environment 210. Each of the thread group objects 224A and 224B includes an interface 229A and 229B, respectively, through which information regarding the corresponding thread groups 214A and 214B may be discovered.

The debugger engine 220 may also abstractly represent the functionality of a thread vector using a thread vector object. For instance, in FIG. 2, the debugger engine 220 formulates thread vector objects 225A and 225B, which each include a corresponding interface 233A and 233B through which information regarding a corresponding thread vector may be represented. A thread vector contains a group of threads that normally execute the same instruction. The interface may, for example, contain methods to 1) get details of the vector, such as its group identifier and starting thread index, its width, and whether there is thread divergence, 2) get a list of stack frames for non-divergent threads, 3) get underlying thread objects, 4) get a list of divergent threads, 5) get the thread group this vector belongs to, and so forth.

A debugger user interface module 230 may interface through the interface 232 to discover information previously discovered by the debugger engine 220 through the interface 231 about the data parallel environment 210. General information regarding the data parallel environment 210 may be obtained through the interface 232. For instance, how many devices and/or the identity of the devices in the data parallel environment, a count and/or identification of the programs running in the data parallel environment, operational statistics regarding the data parallel environment, and so forth.

Specific information regarding a particular program may be discovered by the debugger user interface module 230 through the respective API. For instance, the debugger user interface module 230 may discover information regarding kernel 212A from program object 222A through interface 227A, and information regarding kernel 212B from program object 222B through interface 227B. For instance, the debugger user interface module 230 may obtain a count for a number of thread groups having threads that are associated with the kernel, a start time for the kernel, handles for accessing the associated thread group objects for the kernel, and so forth.

Specific information regarding a particular thread group may be discovered by the debugger user interface module 230 through the respective API. For instance, the debugger user interface module 230 may discover information regarding thread group 213A from thread group object 223A through interface 228A, and information regarding thread group 213B from thread group object 223B through interface 228B. For instance, the debugger user interface module 230 may obtain a count for a number of threads that are included within the thread group, an identifier or handle for each thread, a start time for the thread, a status of the thread, and so forth.

Specific information regarding a particular thread may be discovered by the debugger user interface module 230 through the respective API. For instance, the debugger user interface module 230 may discover information regarding thread 214A from thread object 224A through interface 229A, and information regarding thread 214B from thread object 224B through interface 229B. For instance, the debugger user interface module 230 may obtain a current status of the thread execution, a call stack associated with the thread execution, and so forth.

Figure 3:
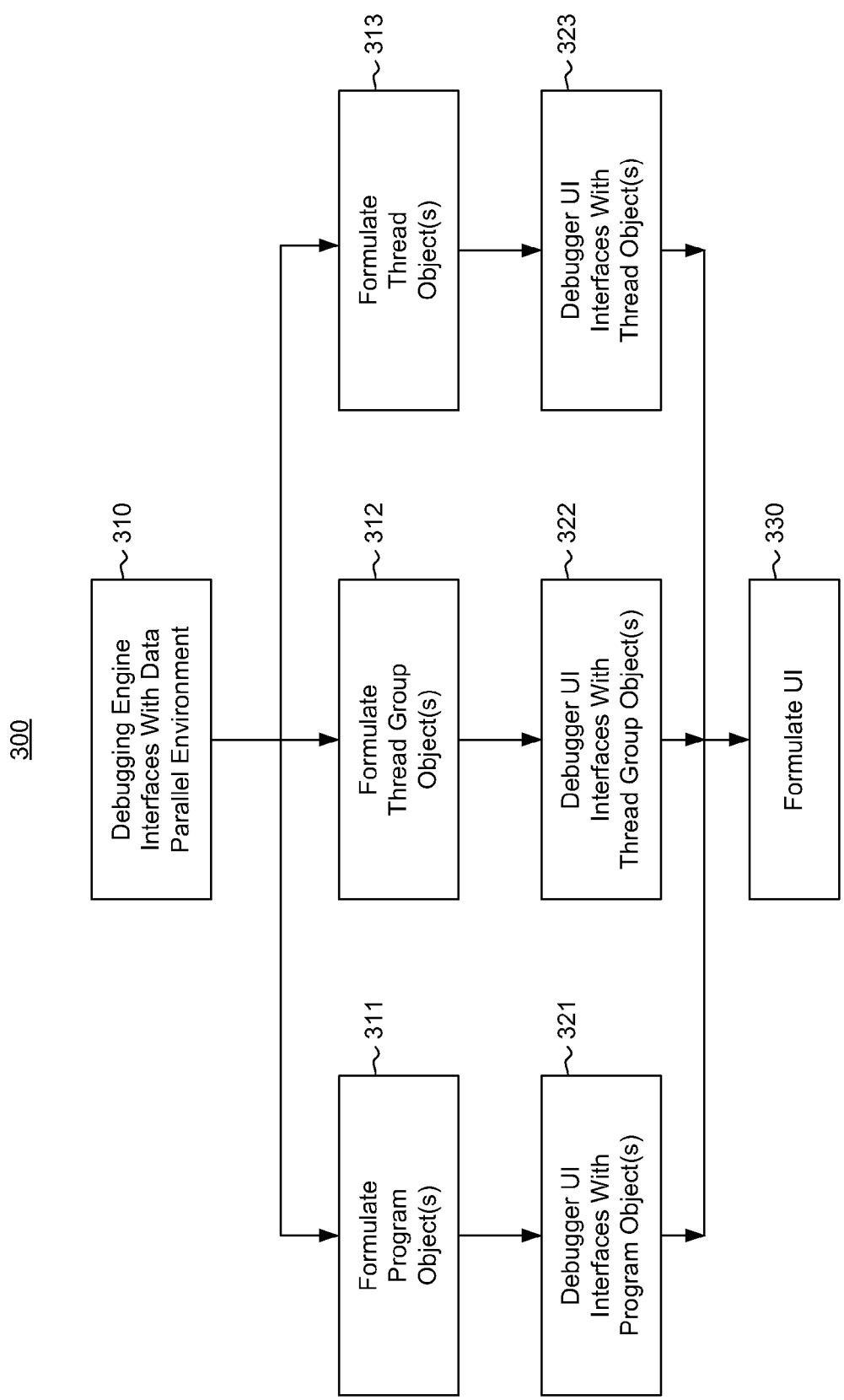
FIG. 3 illustrates a flowchart of a method for debugging a kernel that may be performed, as an example, in the environment of FIG. 2.

FIG. 3 illustrates a flowchart of a method 300 for debugging a kernel. The method 300 may be performed in the environment 200 of FIG. 2. The debugger engine 210 interfaces with the data parallel environment through interface 231 (act 310). Based on this interaction, the debugger engine 220 formulates program objects such as program object(s) 222 (act 311), formulates thread group objects such as thread group object(s) 223 (act 312), and formulates thread objects such as thread object(s) 224 (act 313). In one embodiment, acts 310 through 313 are performed for a given kernel whenever the kernel encounters a break state, thereby updating the program object with data representing the current status of the corresponding kernel, updating each of its thread group objects with data representing the current status of each of the corresponding thread groups, and updating each of the thread objects of each of those thread groups with data representing the current status of the corresponding threads. Thus, at the breakpoint, the debugger engine 220 may use the interface 231 to populate each object with appropriate information, and create objects as necessary. The kernel may, for example, enter a break state when the data parallel environment as a whole enters a break state, such as when the source program encounters a breakpoint.

The debugger user interface module 230 then may interface with the debugger engine 220 through the interface 232 (act 220) to identify key information regarding the data parallel environment as a whole including identifying the available program objects. The debugger user interface module 230 may also interface with each of the program object(s) 222 through their respect interfaces (act 321) to identify key information regarding the respective program including identifying the thread group objects that belong to the kernel. Likewise, the debugger user interface module 230 may interface with each of the thread group object(s) 223 through their respect interfaces (act 322) to identify key information regarding the respective thread groups including identifying the thread objects that below to the thread group. Finally, the debugger user interface module 230 may interface with each of the thread object(s) 224 through their respect interfaces (act 323) to identify key information regarding the respective threads. This information may be used by the debugger user interface to construct a user interface that visualizes the data parallel environment to the user (act 230).

Accordingly, the principles described herein allow for the effective debugging of data parallel environment. In one embodiment, one or more kernels in the data parallel environment may have a source program. In that case, the interface for the program object may allow the debugger user interface module to identify that source application. For instance, a source application may offload code (i.e., a kernel) to a device in the data parallel environment. This may be done by having the source program provide the offload code to a compiler that compiles the code into a device-independent form. That device-independent code may then be is then further modified into device-specific code (i.e., the kernel) by a device driver corresponding to the device on which the kernel is to be loaded. The source program may then provide input to the kernel by assigning the kernel resources. The kernel, properly loaded on the device and provided with resources, may then execute in parallel and may itself perform data parallel operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes a plurality of data parallel devices, for developing data for debugging a data parallel program, the method comprising:
   an act of executing a plurality of data parallel kernels at a data parallel environment, including executing at least one data parallel kernel at each of a plurality of data parallel devices in the data parallel environment, wherein each data parallel kernel operates at least one corresponding thread; and
   an act of a debugger engine interfacing with the data parallel environment and, for at least one of the plurality of data parallel kernels, formulating one or more objects that represents the execution of said data parallel kernel in the data parallel environment, wherein the one or more objects include one or more of:
      a program object that represents data parallel functionality of said data parallel kernel, wherein the program object includes a first interface that allows information regarding said data parallel kernel to be discovered through a debugger user interface module;
      a thread group object that represents functionality of a group of threads operating at said data parallel kernel, wherein the thread group object includes a second interface that allows information regarding the group of threads to be discovered through the debugger user interface module;
      a thread object that represents a thread operating at said data parallel kernel, wherein the thread object includes a third interface that allows information regarding the thread to be discovered through the debugger user interface module; or
      a thread vector object that represents a thread vector of a group of operating at said data parallel kernel and that are executing the same instruction, wherein the thread vector object includes a fourth interface that allows information regarding the thread vector to be discovered through the debugger user interface module.

2. A computer program product comprising one or more physical storage devices having stored thereon computer executable instructions, that when executed by one or more processors of a computing system, causes the computing system to perform the following:
   an act of executing a plurality of data parallel kernels at a data parallel environment, including executing at least one data parallel kernel at each of a plurality of data parallel devices in the data parallel environment, wherein each data parallel kernel operates at least one corresponding thread; and
   an act of a debugger engine interfacing with the data parallel environment and, for at least one of the plurality of data parallel kernels, formulating one or more objects that represents the execution of said data parallel kernel in the data parallel environment, wherein the one or more objects include one or more of:
      a program object that represents data parallel functionality of said data parallel kernel, wherein the program object includes a first interface that allows information regarding said data parallel kernel to be discovered through a debugger user interface module;
      a thread group object that represents functionality of a group of threads operating at said data parallel kernel, wherein the thread group object includes a second interface that allows information regarding the group of threads to be discovered through the debugger user interface module;
      a thread object that represents a thread operating at said data parallel kernel, wherein the thread object includes a third interface that allows information regarding the thread to be discovered through the debugger user interface module; or
      a thread vector object that represents a thread vector of a group of operating at said data parallel kernel and that are executing the same instruction, wherein the thread vector object includes a fourth interface that allows information regarding the thread vector to be discovered through the debugger user interface module.

3. The computer program product in accordance with claim 2, wherein the computer-executable instructions are further structured such that, when executed by the one or more processors of the computing system, the computer-executable instructions further cause the computing system to perform the following:
   an act of the program object interfacing with a debugger user interface module through the first interface to provide information regarding the said kernel to the debugger user interface.

4. The computer program product in accordance with claim 2, wherein at least one of the plurality of data parallel devices is a general-purpose graphics processing unit (GPGPU).

5. The computer program product in accordance with claim 2, wherein the one or more objects include the program object and the thread group object, and wherein the computer-executable instructions are further structured such that, when executed by the one or more processors of the computing system, the computer-executable instructions further cause the computing system to perform the following:
   an act of associating the thread group object with the program object corresponding to said kernel that runs the group of threads.

6. The computer program product in accordance with claim 2, wherein the one or more objects include the thread group object, and wherein the second interface of the thread group object may be used to list how many threads there are in the thread group corresponding to the thread group object.

7. The computer program product in accordance with claim 2, wherein the one or more objects include the thread group object, and wherein the second interface of the thread group object may be used to enumerate the threads in the thread group corresponding to the thread group object.

8. The computer program product in accordance with claim 2, wherein the one or more objects include the thread group object, and wherein the second interface of the thread group object may be used to determine which threads in the thread group corresponding to the thread group object are active.

9. The computer program product in accordance with claim 2, wherein the one or more objects include the thread group object, and wherein the second interface of the thread group object may be used to obtain a thread object corresponding to at least some of the threads that belong to the thread group corresponding to the thread group object.

10. The computer program product in accordance with claim 2, wherein the one or more objects include the thread object, and wherein the computer-executable instructions are further structured such that, when executed by the one or more processors of the computing system, the computer-executable instructions further cause the computing system to perform the following:
   an act of associating the thread object with the thread group object corresponding to the group of threads that the thread belongs to.

11. The computer program product in accordance with claim 2, wherein the one or more objects include the thread object, and wherein the third interface of the thread object may be used to identify the thread group to which the thread belongs.

12. The computer program product in accordance with claim 2, wherein the one or more objects include the thread object, and wherein the third interface of the thread object may be used to identify a status of the thread.

13. The computer program product in accordance with claim 2, wherein the one or more objects include the program object, and wherein the first interface comprises one or more methods whereby a source program of the kernel may be identified.

14. The computer program product in accordance with claim 2, wherein the one or more objects include the program object, and wherein the first interface comprises one or more methods concerning a thread vector of said kernel.

15. The computer program product in accordance with claim 2, wherein the one or more objects include the thread vector object, and wherein the fourth interface comprises one or more methods for one or more of:
   obtaining details for the thread vector including a group identifier, starting thread index, thread vector width, and whether there is thread divergence;
   obtaining a list of stack frames for non-divergent threads;
   obtaining underlying thread objects;
   obtaining a list of divergent threads; or
   obtaining a thread group to which the thread vector belongs.

16. A computer system, comprising:
   one or more processors; and
   one or more computer readable media having stored thereon computer executable instructions, that when executed by the one or more processors, causes the computing system to perform the following:
      an act of executing a plurality of data parallel kernels at a data parallel environment, including executing at least one data parallel kernel at each of a plurality of data parallel devices in the data parallel environment, wherein each data parallel kernel operates at least one corresponding thread; and
      an act of a debugger engine interfacing with the data parallel environment and, for at least one of the plurality of data parallel kernels, formulating one or more objects that represents the execution of said data parallel kernel in the data parallel environment, wherein the one or more objects include one or more of:
         a program object that represents data parallel functionality of said data parallel kernel, wherein the program object includes a first interface that allows information regarding said data parallel kernel to be discovered through a debugger user interface module;
         a thread group object that represents functionality of a group of threads operating at said data parallel kernel, wherein the thread group object includes a second interface that allows information regarding the group of threads to be discovered through the debugger user interface module;
         a thread object that represents a thread operating at said data parallel kernel, wherein the thread object includes a third interface that allows information regarding the thread to be discovered through the debugger user interface module; or
         a thread vector object that represents a thread vector of a group of operating at said data parallel kernel and that are executing the same instruction, wherein the thread vector object includes a fourth interface that allows information regarding the thread vector to be discovered through the debugger user interface module.

17. The computer system in accordance with claim 16, wherein the one or more objects include the program object.

18. The computer system in accordance with claim 16, wherein the one or more objects include the thread group object.

19. The computer system in accordance with claim 16, wherein the one or more objects include the thread object.

20. The computer system in accordance with claim 16, wherein the one or more objects include the thread vector object.

* * * * *